H. G. SEDINGER.
NUT LOCK.
APPLICATION FILED JUNE 16, 1915.

1,180,672.  
Patented Apr. 25, 1916.

Inventor  
H. G. SEDINGER

By *Watson E. Coleman*  
Attorney

UNITED STATES PATENT OFFICE.

HERBERT G. SEDINGER, OF NEAR ATHENS, ALABAMA.

NUT-LOCK.

1,180,672. Specification of Letters Patent. Patented Apr. 25, 1916.

Application filed June 16, 1915. Serial No. 34,447.

*To all whom it may concern:*

Be it known that I, HERBERT G. SEDINGER, a citizen of the United States, residing near Athens, in the county of Limestone and State of Alabama, have invented certain new and useful Improvements in Nut-Locks, of which the following is a specification, reference being had to the accompanying drawings.

This invention relates to certain improvements in nut locks and has relation more particularly to a device of this general character wherein a cross key is employed for coupling the nut and its coacting bolt; and it is an object of my invention to provide a novel and improved device of this general character wherein no special construction of bolt is required and wherein a maximum of efficiency is afforded.

It is also an object of my invention to provide a novel and improved device of this general character wherein the possibility of stripping the threads on the bolt or in the nut is substantially entirely eliminated.

The invention consists in the details of construction and in the combination and arrangement of the several parts of my improved nut lock whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1:
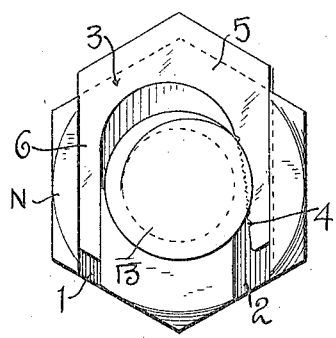
Figure 3:
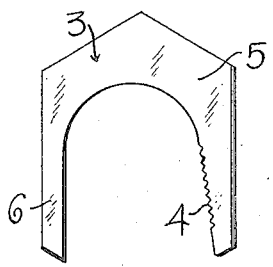
Figure 2:
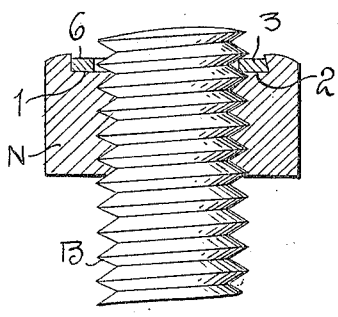
Figure 4:
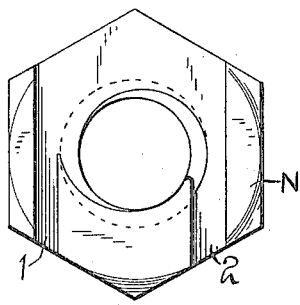

Figure 1 is a view in top plan illustrating a nut lock constructed in accordance with an embodiment of my invention; Fig. 2 is a longitudinal sectional view taken through the invention as disclosed in Fig. 1, the coacting bolt being shown in fragment; Fig. 3 is a view in plan of the locking element as herein embodied; and Fig. 4 is a view in plan of the face of the nut with which the locking element coacts.

As disclosed in the accompanying drawings, B denotes a conventional bolt with which the nut N is adapted to coact. One face of the nut is provided with the open-ended channels 1 and 2, the channel 2 intersecting the bore of the nut and of a width in excess of the width of the channel 1 and has its outer wall undercut to form a guide-way for the wedge 3, the inner edge of which being provided with the outwardly inclined teeth 4 adapted to engage the bolt B between the threads thereof. The inner or broader extremity of the wedge 3 is integrally connected by the head 5 with the arm 6 disposed substantially parallel with the wedge 3 and adapted to travel within the channel 1, and the nut N between adjacent extremities of the channels 1 and 2 is cut-away so that no obstruction will be offered to the head 5 as the wedge 3 and the arm 6 are forced into operative position.

The wedge 3 and the arm 6 are not placed within the channels 1 and 2 until after the nut N has been screwed up on the bolt slightly tighter than is necessary whereupon the nut N is turned slightly to the left until the key is drawn firmly into the threads of the bolt. To remove the bolt, the nut N is turned slightly to the right whereupon the wedge 3 and the arm 6 will automatically be forced outwardly.

It is thought to be clearly apparent to those skilled in the art to which my invention relates that a lock constructed in accordance with an embodiment of my invention substantially entirely eliminates the possibility of stripping the threads on the bolt B or in the nut N as the turn to the left to tighten the wedge 3 serves to take off all unnecessary tension and at the same time maintains the nut and bolt securely coupled. It will also be perceived that with a nut lock constructed in accordance with an embodiment of my invention the more the nut turns in a direction to come off of the bolt the tighter the wedge 3 is drawn into the threads.

From the foregoing description, it is thought to be obvious that a nut lock constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

As a new article of manufacture, a nut having substantially parallel channels in one of its faces, one of said channels intersecting the bore of the nut, a wedge insertible within the channel intersecting the bore of the nut, said last named channel being of a width in excess of the width of the wedge, the inner edge of the wedge being provided with the outwardly inclined teeth, an arm insertible within the second channel, and a head connecting adjacent extremities of said wedge and arm, the outer wall of the channel intersecting the bore of the nut being undercut to receive a marginal portion of the wedge, the face of the nut between adjacent extremities of the channels being cut-away to receive the connecting head of the wedge and arm.

In testimony whereof I hereunto affix my signature in the presence of two witnesses.

HERBERT G. SEDINGER.

Witnesses:
A. P. HENDERSON,
G. G. McCRACKEN.